Dec. 19, 1967   J. M. BOWYER, JR., ET AL   3,358,947
BASE DRAG REDUCTION DEVICE
Filed July 21, 1965   2 Sheets-Sheet 1

JAMES M. BOWYER JR.
WILBERT V. CARTER
INVENTORS

BY *Earl F. Kotts*
ATTORNEY

AGENT

Dec. 19, 1967  J. M. BOWYER, JR., ET AL  3,358,947
BASE DRAG REDUCTION DEVICE
Filed July 21, 1965  2 Sheets-Sheet 2

JAMES M. BOWYER JR.
WILBERT V. CARTER
INVENTORS

United States Patent Office 3,358,947
Patented Dec. 19, 1967

3,358,947
BASE DRAG REDUCTION DEVICE
James M. Bowyer, Jr., Manhattan, Kans., and Wilbert V. Carter, La Jolla, Calif., assignors to General Dynamics Corporation, San Diego, Calif., a corporation of Delaware
Filed July 21, 1965, Ser. No. 473,719
16 Claims. (Cl. 244—73)

This invention relates to a device for drag reduction and thrust augmentation through the use of a computer-controlled external burning secondary power means in a vehicle traveling at subsonic, transonic and low supersonic flight speeds but more particularly relates to a device which provides controlled base drag reduction for blunt-based vehicles.

As a primary object is should be noted that base burning would be very important and efficient if applied to boosters, recoverable boosters, hypersonic transports and spacecrafts.

As is well known the trailing edge or base of an airfoil should have a taper for efficient subsonic, transonic and supersonic flight through the atmosphere. However, in hypersonic flight the most practical and efficient configuration for the trailing edge or base of the airfoil is a chopped-off or blunt design. The present invention is related to blunt-based air-foils or wing sections which provide efficient performance in hypersonic flight mode and below hypersonic flight mode.

Therefore, a novel means for base drag reduction is provided for blunt-based vehicles because the base drag of blunt-based aerodynamic vehicles is a significant part of the total drag imposed on such vehicles at subsonic, transonic, and low supersonic flight speeds. The phenomenon of high base drag on the blunt base regions of aerodynamic vehicles is only slightly influenced by the shape of the base, i.e., a flat, concave or convex surface.

Significant reduction of the aerodynamic drag generated by blunt-base regions can be accomplished by ventilation of these regions, either aerodynamically or, more effectively, by exhausting propulsive gases through these regions.

In a recent series of experiments, it was proven that a significant reduction in the base drag of a blunt-based region not ventilated by other means can be obtained by injecting a fuel into the base region aft of the vehicle structure, mixing this fuel with the air recirculating in this region, and igniting the resulting mixture. The fuel is injected at low flow rates and is not injected through nozzles or ducts but rather through porous membranes, perforated plates, or slots. The flow is injected at such a low rate so as to disturb the circulation of the air in the base region, a slight amount, which provides the means for efficiently mixing the fuel with the air. Moreover, it has been demonstrated that for a certain range of fuel rates and aerodynamic speeds, this means of drag reduction is a much more efficient way of increasing the net thrust of the aerodynamic vehicle with which such a blunt-base region is associated than is the combustion of additional fuel in any primary propulsion system. Stated in other terms, the equivalent specific impulse realized from the combustion of fuel in an otherwise unpowered base region of an aerodynamic vehicle is greater than the specific impulse realized from the combustion of fuel in any primary propulsion system of the same vehicle when the areodynamic speed of the vehicle is high subsonic, transonic, or moderately supersonic and when the base drag reduction obtained from base burning is limited to something less than complete elimination of the base drag contributed by the base region under consideration.

Furthermore, this drag reduction device is a secondary propulsion system, which has a control system for monitoring two unlike propulsion systems automatically for a net gain in the overall vehicle's performance. When the secondary system is operating it can reduce the flow of fuel to the primary system allowing it to maintain the same acceleration or velocity, because the drag of the vehicle has been reduced substantially. Another variation would be to keep the fuel flow the same to this primary system when the base burning is operating thus allowing the payload to be increased. This device does not improve the efficiency of a vehicle by generating reaction forces, but improves its performance by filling the separated region with burning gases.

Thus, the purpose of the device described herein is controlled reduction of the drag which would otherwise result from a region of separated flow, i.e., a blunt-based region. It is emphasized that this purpose is distinct from the concept of supersonic burning, i.e., combustion in the vicinity of surfaces over which the flow would not normally be sepaarated under non-burning conditions.

It should be noted further that this invention is applicable to any part of a vehicle base area which is not occupied by the operating primary propulsion means. Such a system is also applicable to any base occupied by primary propulsion under the certain operating conditions.

A controlling mechanism is part of this device and its purpose is to control the flow of fuel to the primary propulsion system and/or the base region affected by high base drag, in a reliable and efficient manner, whenever such vehicles are traveling at high subsonic, transonic, or low supersonic speeds through the atmosphere. Two instances in which this mechanism might be used for vehicular propulsion are (a) to reduce fuel consumption during that part of the flight regime and to extent that the base-burning device has at least as large a specific impulse as the primary propulsion system or (b) to provide desired additional thrust, thus providing some other desired improvement in overall vehicular performance. When the base burning device can no longer be operated advantageously, the mechanism control ordinarily would terminate fuel flow to the base region automatically. The mechanism would eliminate the necessity for the crew (if there is one) to control the fuel flow manually; however, a manually operated over-ride control will be provided for use in case of an emergency on any manned vehicle.

The fuel is injected in the base or separated region aft of the vehicle structure where the fuel becomes mixed with the air circulating in the base region and then it is ignited and burned. No ducting, shrouds or other vehicle structure is required for controlling or containing the mixing of the fuel with the air or the ignition or for the burning of the fuel. Without this structure, the burning can be made to take place in all of the separated region saving the weight of the structure and reducing the base drag over a greater base area, thus making the vehicle more efficient.

The blunt-based vehicles may be of cylindrical body shape or wing shape or combination of both and, as explained hereinafter, can be reliably and efficiently reduced of their base drag by this invention in a controlled system applicable to rocket motors, turbojets, ram jet and other propulsion devices.

It is therefore an object of the present invention to provide in a blunt-based vehicle a fuel burning structure and a control system wherein fuel is metered to the base to provide minimum drag and optimum thrust under the existing conditions of flight.

It is another object of the present invention to provide a means for counteracting base drag on a blunt-based vehicle flying in a mach number range of 1.0 to 3.5 within the atmosphere and whereby thrust can be more efficiently created at the base (3 to 5 times using hydrogen fuel) than burning additional fuel in the primary power source.

It is an additional feature of the present invention to provide a base structure composed of a porous, slotted or perforated surface which eliminates insulation or fuel cooling means.

All together this simple, reliable and relatively very efficient base drag reduction device as well as additional objects and advantages thereof, will be readily understood by the following detailed description when considered in connection with the accompanying drawings wherein, FIGURE 1 is a perspective view of a spacecraft having a blunt-base;

In brief the invention contemplates a novel device residing in a vehicle's blunt-based surfaces, with a fuel burning structure and a control system in connection therewith wherein fuel is burned at the blunt-base to provide minimum drag and optimum thrust, simultaneously under the existing conditions of flight through the atmosphere.

Figure 1:
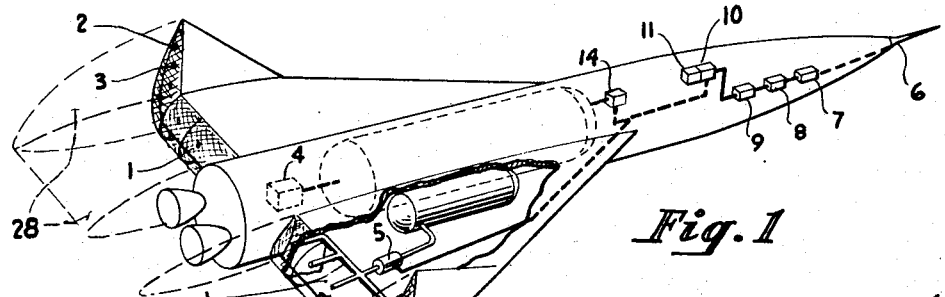

Referring now to the drawings wherein like reference characters designate corresponding parts throughout FIGURES 1 through 5, there is shown in FIGURE 1 a spacecraft with blunt-based surfaces. Incorporated therein is a drag reduction device which consists of a base plenum 1 with burning structure means such as, a slotted, porous or perforated plate 2 at the base. A fuel/air mixture in the ignition region of the base is ignited by a spark plug 3 or other ignition means. The burning structure means 2 may cover all or only portions of the base, depending on the configuration. The base shape can be flat, concave or convex.

An automatic controller means, which is part of this device, consists of two proportional fuel flow regulator systems 4 and 5, which are used for the primary propulsion system and for the base drag reduction device respectively. Direct sensor means for free stream mach number 6, angle of attack 7 and density or altitude 8, or sensors of other quantities may be used. The output of the direct sensor means 6, 7, and 8 are providing input data to a computer 9. The computer 9 will determine the specific impulse of the base burning device ($I_{sp_b}$). These direct sensor means and/or other sensor means will provide the input data required by a second computer 10 to determine the specific impulse of the primary propulsion system ($I_{sp_p}$).

Figure 3:
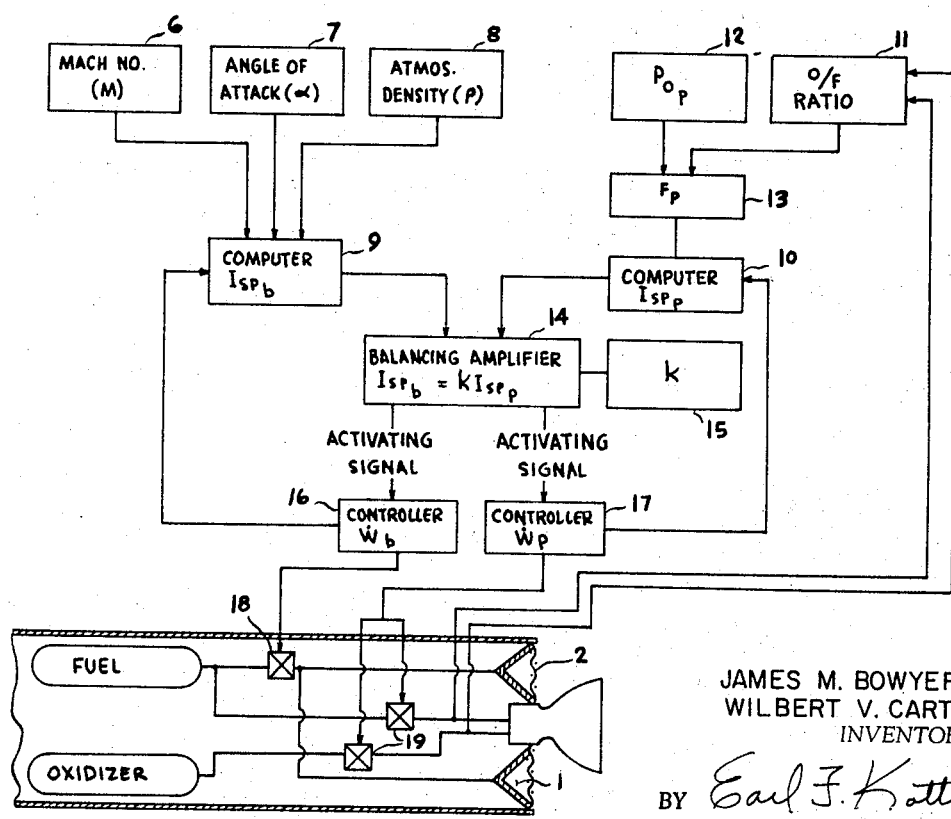
FIGURE 3 is a sketch of a control system used with rocket engines and based on specific impulse information.

Referring now to FIGURE 3, a schematic block diagram for reducing base drag on a blunt-based vehicle with rocket engines as a primary propulsion system is shown. Sensor means 6, 7 and 8 for sensing respectively free stream mach number, angle of attack and atmospheric density are electrically connected to a computer 9.

The specific impulse determined by the computer 10 is derived from input data through the oxidizing fuel ratio means 11, and a combustion chamber stagnation pressure sensing means 12 combined through a thrust measuring means 13 and fed into the computer 10. The outputs of the computers 9 and 10 are connected to a balancing amplifier means 14 which will compare the specific impulse of the base burning propulsion system ($I_{sp_b}$) with the specific impulse of the primary propulsion system ($I_{sp_p}$) multiplied by a parameter function $k$ indicated at 15. The balancing amplifier 14 will determine an actuating signal for the base system as well as the primary fuel system. Regulator flow control means 16 and 17 are connected with fuel valves 18 and 19 respectively for individual control thereof.

Figure 4:
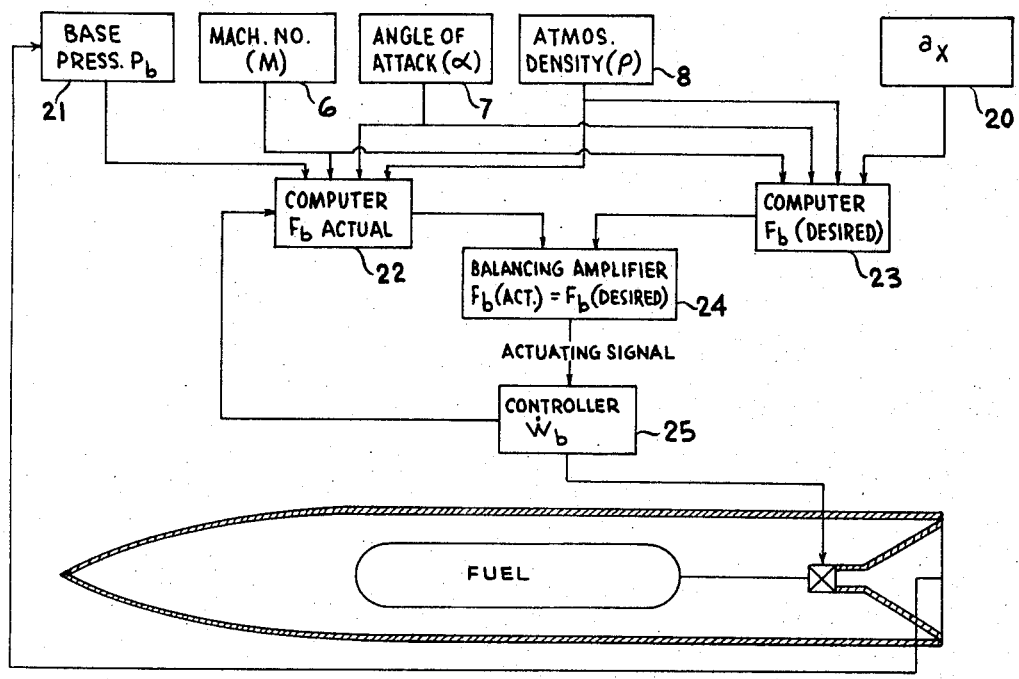
FIGURE 4 is a sketch showing a control system for use with ramjet, turbojet or rocket motors, and wherein thrust instead of specific impulse is considered.

Referring to FIGURE 4 there is shown a schematic of the base drag reduction device for a blunt-based vehicle with a ramjet or turbojet as the primary propulsion system. This system considers thrust rather than specific impulse as in FIGURES 3 and 5. The first input computer 22 for actual thrust information comprises sensing means for the free stream mach number 6, angle of attack 7, atmospheric density 8 and base pressure 21. The two input computers 23 and 24 for actual thrust and desired thrust information are connected with the sensing means and the computer 24 is also connected with a longitudinal accelerometer 20. Both computers 22 and 23 are tied in with a balancing amplifier 24 comparing the ratio of $Fb$ (actual)$=Fb$ (desired) and its computed actuating signal is fed into the propulsional fuel flow regulator 25 for the control of the base fuel flow ($Wb$) to the vehicles burning structure means 2.

Figure 5:
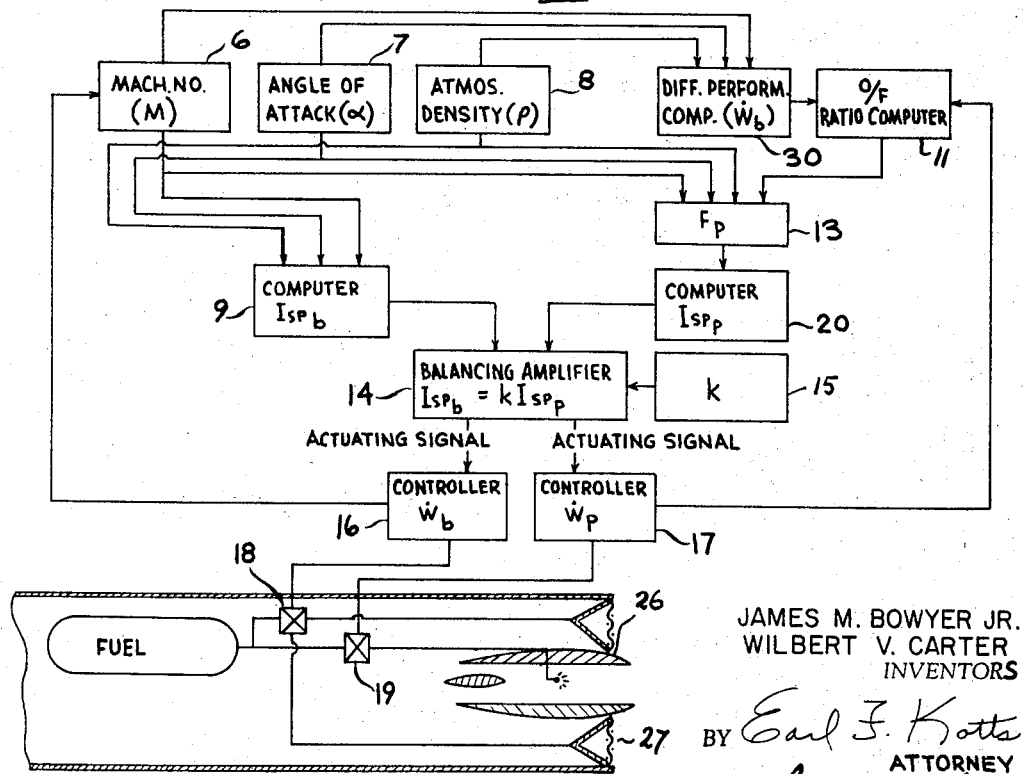
FIGURE 5 is a system similar to that shown in FIGURE 3 wherein specific impulse information is used by the primary propulsion device, ramjet or turbojet rather than rocket.

Another method for a ramjet or turbojet primary propulsion system with base burning is shown in a schematic layout in FIGURE 5. The input required incorporates the sensor means for free stream mach number 6, angle of attack 7, atmospheric density 8. The information output signal from the sensing means is fed into a first computer 9 and through a thrust measuring means 13 into a second computer 10. A third computer 30 is interconnected between the sensor means 6, 7 and 8 and the oxidizer fuel ratio means 11. The output of computers 9 and 10 are balanced through the balancing amplifier 14 for generating a signal proportional to $I_{sp_b}=k.I_{sp_p}$.

In general the present invention provides a device which controls reduction of the base drag of a blunt-based vehicle during its subsonic, transonic, and supersonic flight through the atmosphere. The vehicle is provided with means for burning fuel which are disposed on said blunt-based area and is further equipped with flight conditioning sensing means which are electrically connected with control means. The control means are responsive to the flight condition sensing means and are thereby enabled to regulate the fuel flow control means so that the fuel flow to the burning fuel structure means disposed on the vehicle's blunt-based area is regulated as a result of the flight conditions of the vehicle, sensed by the sensing means.

As stated in the general statement above, the device for base drag reduction comprises; a burning structure and a control mechanism.

The control mechanism or means essentially controls the flow of fuel to the primary system and the base region affected by high base drag, in a reliable and efficient manner, whenever a vehicle is traveling at subsonic, transonic or low supersonic speeds through the atmosphere.

Figure 2:
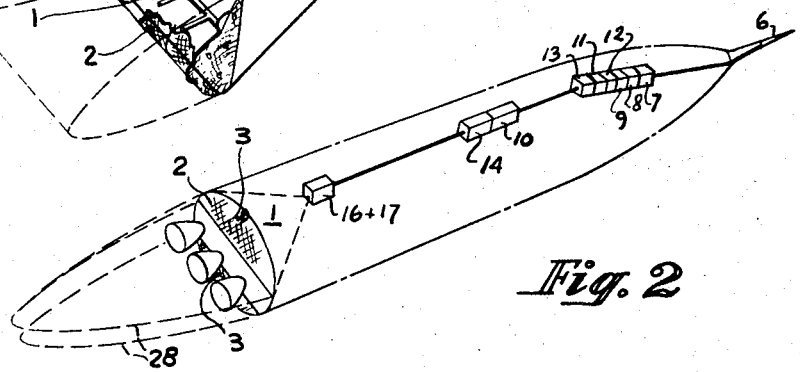
FIGURE 2 is a perspective view of a missile or rocket.

The basic burning structure configuration for the disclosed base drag reduction device is shown in FIGURES 1 and 2, where two typical blunt-based vehicles are illustrated. The base burning structure comprises a base plenum 1 which is covered by a burning structure means such as a perforated slotted or porous plate 2 and a sparkplug or ignition means 3. Fuel introduced in the base plenum 1 will when ignited form a flame which will provide the vehicle with a streamlined non-drag contour or oval outline 28 so that speed is accelerated, however with less weight penalty than having a fixed structure and by using a very small amount of extra fuel.

The control system for the disclosed base drag reduction device is illustrated for three preferred embodiments in FIGURES 3, 4 and 5.

As shown in FIGURE 3 the automatic controller means requires five inputs, free stream mach number 6, angle of attack 7, altitude by atmospheric density 8, fuel mixture ratio of the primary system 11, and the combustion chamber stagnation pressure of the primary system 26, which are connected to the first and second computers as shown in the schematic FIGURE 3. The following 7 output functions are achieved: (1) the time period of starting the base burning system; (2) the opening of fuel valves to the base; (3) ignition of the fuel by the ignition means; (4) the $I_{sp_b}$ is computed on the base burning system; (5) the $I_{sp_p}$ is computed of the primary propulsion system; (6) control of each fuel flow regulator proportionally to both systems and (7) the time when the base burning system has to be shut off.

The automatic controller means consists of two proportional fuel flow regulators, 16 and 17, one for the primary propulsion system 26 and one for the base drag reduction system 27. Direct sensors for free stream mach number 6, angle of attack 7 and density (altitude) 8 provide input data to the first computer 9 which determines the specific impulse of the base burning system, ($I_{sp_b}$).

The outputs of the computers 9 and 10 mentioned in the above paragraph will be compared by a balancing amplifier means 14 in a unique manner: This amplifier 14 will compare the specific impulse ($I_{sp_b}$) of the base burning propulsion system 26 to the product of a constant, $k15$, by the specific impulse of the primary propulsion system ($I_{sp_p}$).

The output of the amplifier 14 which compares $$I_{sp_b} : k I_{sp_p}$$

will be employed to regulate the fuel flow to each of the two propulsion systems i.e. the primary propulsion system and the base-burning propulsion system 27. When $k=1$ the overall specific impulse will be about optimum for the combined propulsion system under ordinary conditions. However, the provision for $k \neq 1$ will allow additional flexibility in the operation of the combined system. $k15$ could be called a weighting parameter which would give more or less importance to the base thrust or primary thrust depending on the flight conditions.

A typical sequence of operation for the base burning system can be described in the following manner. When a blunt-base vehicle reaches some desired subsonic Mach number determined by the automatic controller means, a small portion of the fuel for the primary propulsion system 26 is diverted to the base plenum 1. The fuel then flows through the porous base plate 2 and is ignited by a spark plug 3. The fuel flow is varied, by the valve 18, which is controlled by the automatic controller 16, so as to provide optimum specific impulse for the combined system.

The sequence of operation for the automatic controller means is as follows:

Firstly, when the velocity sensor (Mach meter) 6 indicates the vehicle is accelerating through the high subsonic regime, this device begins to function automatically.

Secondly, the outputs from the Mach number 6, angle of attack 7 and density sensors 8 are fed into a computer 9 that determines the fuel required ($W_b$) to give an ($I_{sp_b}$) that will equal the specific impulse of the operating part of the primary propulsion system 26 ($I_{sp_p}$) multiplied by a constant of proportionality 15, $k$. The specific impulse of the operating part of the primary system ($I_{sp_p}$) is determined from the outputs of its sensors, including the fuel flow ($W_p$) by the second computer 10.

Next the fuel flow control means 16 and 17 begin to function and the ignition system 3 ignites the fuel. The balancing amplifier 14 generates a signal proportional to the difference of $I_{sp_b} - k.I_{sp_p}$ which signal is used to control the fuel flow through valves 18 and 19.

An alternate scheme to the above method would be where the fuel flow is varied, by the automatic controller so as to provide optimum thrust. A block diagram of this method is shown in FIGURE 4.

This alternate method requires 5 inputs: (1) free stream Mach No. 6, (2) angle of attack 7, (3) altitude (density) 8, (4) base pressure 21, and (5) longitudinal acceleration 20.

The output functions of the controller can be described as follows: (1) Determine optimum time to start the base burning system, (2) Start flow of fuel to the base, (3) Ignite the fuel injected into the base region, (4) Computer thrust ($F_b$) of the base-burning system, (5) Compute the thrust ($F_b$) required from base-burning system in order to satisfy the conditions dictated by the criterion or criteria for optimization, (6) Control the proportional fuel flow regulators to both systems, (7) Shut off the base-burning system whenever it is determined that the system does not improve thrust in accord with the chosen criterion or criteria.

The automatic controller means for this alternate method is made up of one proportional fuel flow regulator 15 and three computers. The direct sensors for mach number 6, angle of attack 7, density (altitude) 8, and base pressure 21 provide input data to a balancing amplifier 24 which determines the thrust of the base-burning system 27.

At the same time the second computer 23 determines the (desired) thrust of the primary propulsion system 26 using the inputs below, which would be computed prior to flight time from the desired flight profiles, thus determining the optimum or desired flight conditions: (1) longitudinal acceleration (2) density (3) angle of attack and (4) mach number.

The outputs of the two computers 22 and 23 will be compared by the balancing amplifier 24. This amplifier will compare the actual thrust with the desired thrust. The output from the amplifier 24 will be a signal to the proportional fuel flow regulator 25 for the base-burning system 27 which controls the fuel flow ($W_b$) to the base plenum 1 of the vehicle.

The above alternate method is for a vehicle with rocket motors, ramjet or turbojet, as its primary propulsion system 26. This system did not require controlling the primary propulsion fuel flow.

Another method suitable for a ramjet or turbojet primary propulsion system with base-burning is shown in FIGURE 5. This method requires the following inputs: (1) free stream mach number 6, (2) angle of attack 7, and (3) density which are fed into the first computer 9 but also into a third computer 30.

This computer 30 is a diffuser performance computer which determines by its collected information, from the free stream mach number sensor 6, angle of attack sensor 7, and atmospheric density sensor 8, the fuel flow rate required for optimum performance.

This last information together with the existing fuel flow achieved at the valve stand 18 in the primary propulsion system 26, will provide the required input for the oxidizer fuel ratio means 11 for determining optimum fuel ratio information.

The input of the thrust sensing means 13 comprises optimum fuel ratio information plus information from the mach number sensor 6, angle of attack sensor 7, and atmospheric density sensor 8. The total thrust for the primary propulsion system 26 is then calculated by the thrust sensor means 13 and fed into the balancing amplifier mans 14 for determining the specific impulse or $I_{sp_p}$.

As can be clearly seen, the schematic shown in FIGURE 5 is further identical with the schematic shown in FIGURE 3, the only difference being the type of propulsion system used in the vehicle. Therefore, the input for determining optimum condition and specific impulse uses different parameters in order to achieve the same control technique as used in FIGURE 3.

It is understood, whenever the term vehicle is used in the specification and claims that this term relates to all kinds of aerospace vehicles such as: aerospace planes, supersonic and hypersonic transports, re-entry vehicles, space test vehicles and outer space stations, as well as boosters and recovering booster systems incorporated with spacecraft, etc.

It is also understood, that various other structural modifications of the invention may be contemplated by those skilled in the art without departing from the spirit and scope of the invention as hereinafter defined by the appended claims.

We claim:

1. A device for controlled reduction of base drag for a blunt-based vehicle for subsonic, transonic and supersonic flight through atmosphere, comprising in combination:
   (a) means disposed on said blunt-based vehicle for burning fuel rearwardly of said blunt base;
   (b) flight condition sensing means connected with a control means; and
   (c) said control means responsive to said flight condition sensing means and adapted to regulate fuel to be burned in said fuel burning means in accordance to said vehicle condition of flight sensed by said flight condition sensing means.

2. The device as claimed in claim 1 wherein said means for burning fuel comprises
   (a) a blunt-based area having a base plenum covered with a structure for burning fuel,
   (b) ignition means for igniting said fuel on said structure disposed in close coordination therewith, and
   (c) means to feed said fuel to said structure.

3. The device as claimed in claim 1 wherein said flight condition sensing means comprises, mach sensing means, angle of attack sensing means and atmospheric density sensing means disposed on said vehicle for providing input to said control means.

4. The device as claimed in claim 1 wherein said control means comprises computer means having its output connected to fuel flow control means and wherein said fuel flow control means is adapted to regulate fuel flow to said fuel burning means as directed by said computer output.

5. The device as claimed in claim 4 wherein said computer means comprises a first and second computer connected to a balancing amplifier means and wherein said information from said first and said second computer means are balanced to required propulsion actuating signal information and wherein regulation of said fuel flow control means is directed by said actuating signal information from said balancing amplifier means.

6. A device for controlled reduction of base drag for a blunt-based vehicle for subsonic, transonic and supersonic flight through atmosphere, comprising in combination:
   (a) fuel burning means mounted on said vehicle aft of the blunt-based area and wherein said blunt-based area has a base plenum covered with a structure for burning fuel,
   (b) ignition means for igniting said fuel on said structure disposed in close coordination therewith,
   (c) means to feed said fuel to said structure,
   (d) control means connected with flight condition sensing means and thrust sensing means mounted in said vehicle,
   (e) said flight condition sensing means comprising mach sensing means, angle of attack sensing means and atmospheric density sensing means disposed on said vehicle for providing input information together with said thrust sensing means to said control means for computing said information to an actuating signal to regulate said fuel feeding means and ignition means in said burning fuel means.

7. A device for controlled reduction of base drag in a blunt-based vehicle having a primary propulsion means for subsonic, transonic and supersonic flights through the atmosphere comprising in combination:
   (a) a base structure for burning fuel mounted on the blunt-based regions of said vehicle and wherein said base structure is provided with ignition and fuel feeding means,
   (b) flight condition sensing means mounted on said vehicle for providing information to a first computer means mounted on said vehicle,
   (c) vehicle thrust sensing means mounted on said vehicle for providing information to a second computer means mounted on said vehicle,
   (d) said first and said second computer means connected to a balancing amplifier means wherein said information from said first and said second computer means are balanced to required proportional actuating signal information, and
   (e) fuel flow control means mounted on said vehicle and connected to said balancing amplifier means and being regulated thereby through said actuating signal information.

8. The device as claimed in claim 7 wherein said flight condition sensing means comprises a mach number sensing means, an angle of attack sensing means and an atmospheric density sensing means, and wherein said vehicle thrust sensing means derives its information from the outputs of a compression chamber stagnation sensing means and a fuel ratio sensing means, and wherein said first computer means information fed into said balancing amplifier means comprises specific impulse information for said base, and wherein said second computer means information fed into said balancing amplifier means comprises specific impulse information for said primary propulsion system.

9. The device as claimed in claim 8 wherein said balancing amplifier means for producing said required proportional actuating signal information is connected with a means providing a parameter being a constant of proportionality.

10. The device as claimed in claim 9 wherein said fuel flow control means comprises a first fuel flow control regulator means and a second fuel flow control regulator means connected to said base structure and said primary propulsion system respectively and wherein said first and said second fuel flow control means is connected to said first and said second computer means respectively.

11. The device as claimed in claim 7 wherein said flight condition sensing means comprises a mach number sensor means, an angle of attack sensor means, an atmospheric density sensor means and a base pressure thrust sensing means and wherein said vehicle thrust sensing means comprises said mach number sensing means, said angle of attack sensing means, said atmospheric density sensing means and an accelerometer sensing means, and wherein said first computer means and said second computer means each having an output signal containing actual thrust on said base and desired thrust on said base structure respectively.

12. The device as claimed in claim 11 wherein said fuel flow control means is provided with feed back means to said first computer means measuring said actual thrust base information.

13. The device as claimed in claim 7 wherein said flight condition sensing means comprises mach number sensing means, angle of attack sensing means and atmospheric density sensing means, and wherein said vehicle thrust sensing means comprises said mach number sensing means, said angle of attack sensing means, said atmospheric density sensing means, a diffuser performance computer means connected to said flight condition sensing means and connected to fuel ratio means.

14. The device as claimed in claim 13 wherein fuel flow control means comprises a first controller means and a second controller means connected to said base structure and said primary propulsion system respectively.

15. A device for controlled reduction of base drag for a blunt-based vehicle, having rocket engines, turbo or ramjet engines as a primary propulsion system, for subsonic, transonic and supersonic flights through atmosphere, comprising in combination:
- (a) a base structure for burning fuel, mounted on the aft blunt-based region of said vehicle and said structure provided with ignition means and fuel feeding means,
- (b) flight condition sensing means, mounted in said vehicle, for providing information to a first computer means for determining specific impulse information for said base structure,
- (c) thrust measuring means, mounted in said vehicle, and connected with a second computer means for determining specific impulse information for said primary propulsion system,
- (d) a parameter means for allowing flexibility in propulsion operation of said base structure and said primary propulsion system depending on flight requirements mounted in said vehicle,
- (e) said first computer means and said second computer means electrically connected to a means for comparison of said base structure specific impulse information with said primary propulsion specific impulse information multiplied with said parameter means for determining actuating signal information, and
- (f) a first flow control means and a second flow control means mounuted in said vehicle and connected with said comparison means for receiving said actuating signal information and said first and second flow control means further connected with said base structure and said primary propulsion system respectively.

16. The device as claimed in claim 15 wherein said first fuel flow control means comprises a valve connected in said fuel feeding means for regulation thereof by said first fuel flow control means and wherein said primary propulsion system comprises valve means to be regulated by said actuation signal information from said second fuel flow control means.

References Cited
UNITED STATES PATENTS 3,137,460   6/1964   Owl et al. _____ 244—73 X
3,259,065   7/1966   Ross et al. _____ 244—130 X MILTON BUCHLER, *Primary Examiner.*

B. BELKIN, *Assistant Examiner.*